Sept. 30, 1969　　　　　C. LANE ETAL　　　　　3,469,346
ACCESS CONTROL FOR DISPENSERS AND THE LIKE
Filed March 26, 1968　　　　　　　　　　　　　2 Sheets-Sheet 1

INVENTORS
CURTIS LANE
LEON GREENSTEIN
BY
*Steinberg & Blake*
ATTORNEYS

Sept. 30, 1969     C. LANE ET AL     3,469,346

ACCESS CONTROL FOR DISPENSERS AND THE LIKE

Filed March 26, 1968     2 Sheets-Sheet 2

INVENTORS
CURTIS LANE
LEON GREENSTEIN

BY

*Steinberg & Blake*

ATTORNEYS

United States Patent Office 3,469,346
Patented Sept. 30, 1969

3,469,346
ACCESS CONTROL FOR DISPENSERS
AND THE LIKE
Curtis Lane, Riverdale, N.Y., and Leon Greenstein, Cranford, N.J., assignors to Lanex Importing Company, Union, N.J.
Filed Mar. 26, 1968, Ser. No. 716,045
Int. Cl. E05b 65/00; E05d 13/04
U.S. Cl. 49—35                     16 Claims

ABSTRACT OF THE DISCLOSURE

Access control for dispensers and the like, particularly for dispensers of edible products. A door of the dispenser is movable from a closed, access-preventing position to an open, access-affording position, but a blocking means prevents movement of the door to its open position until the blocking means is momentarily displaced by a displacing means to a non-blocking position, a holding means responding to displacement of the blocking means to its non-blocking position to releasably maintain the latter in its non-blocking position. The door upon movement to its open position moves the holding means to a release position releasing the blocking means for return to its blocking position, and upon return of the door to its closed position an engaging means carried by the door engages and moves the blocking means only part of the way toward its non-blocking position through a distance which is too small to permit the holding means to again assume its holding position.

CROSS REFERENCE TO RELATED APPLICATION

A dispenser which may be provided with the structure of the invention is disclosed in U.S. patent application Ser. No. 702,855, filed Feb. 5, 1968.

BACKGROUND OF THE INVENTION

The present invention relates to access controls.

In particular, the present invention relates to access controls to be used with dispensers, particularly dispensers of edible products, so as to control the manner in which access may be had to the products which are dispensed.

When a dispenser is not actually dispensing a product, it is important to prevent access to components of the dispenser so as to prevent tampering therewith. Furthermore, such prevention of access is of particular importance in the case of a dispenser of an edible product, so as to maintain conditions which are as sanitary as possible. Thus, particularly in the case of dispensers of edible products it is important to afford access to the dispenser only when it is required to remove the dispensed product therefrom.

Moreover, in a dispenser which operates through a given cycle in connection with the dispensing of a given amount of a given product, it is important to provide access only once during the cycle to the dispenser to withdraw the dispensed product therefrom, so that in this way repeated access to the dispenser in response to one actuation thereof can be avoided.

Also, it is important to provide access control structure which itself is protected against tampering so that the access control structure itself cannot be tampered with to prevent proper operation thereof.

SUMMARY OF THE INVENTION

It is accordingly a primary object of the present invention to provide an access control which will reliably prevent access to components of the dispenser until the dispenser has been properly actuated.

Another object of the present invention is to provide an access control which will reliably give access to the dispenser only once during each operating cycle.

Furthermore, it is an object of the invention to provide an access control which is fully automatic in its operation and which is closed off from the exterior of the dispenser so as to prevent tampering with the access control.

An additional object of the invention is to provide an access control which automatically maintains a door in a closed position and automatically returns the door to its closed position unless the door is manually displaced to and manually held in its open position.

Furthermore, it is an object of the invention to provide a construction wherein components are gravity-actuated so that an exceedingly simple structure having components which do not rely on springs of the like for movement thereof is provided.

The access control of the invention includes a door means which is movable from a closed, access-preventing position to a fully open, access-affording position. A blocking means has a blocking position preventing movement of the door means to its open position, while a displacing means coacts with the blocking means to displace it at least momentarily to a non-blocking position freeing the door means for movement to its open position. A gravity-actuated holding means responds to movement of the blocking means to its non-blocking position for automatically assuming a holding position holding the blocking means in its non-blocking position, while the door means during movement to its fully open position displaces the holding means to a release position releasing the blocking means for return to its blocking position. During return of the door means to its closed position, an engaging means carried by the door means coacts with the blocking means to provide for movement of the door means back to its closed position without again displacing the blocking means to its non-blocking position, so that in this way the holding means is prevented from again assuming its holding position when the door means returns to its closed position.

BRIEF DESCRIPTION OF DRAWINGS

The invention is illustrated by way of example in the accompanying drawings which form part of this application and in which.

DESCRIPTION OF PREFERRED EMBODIMENTS

Figure 8:
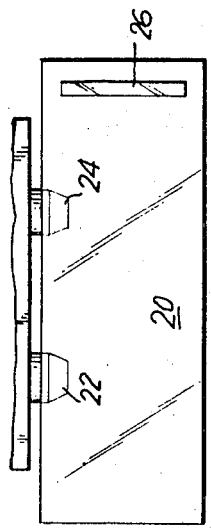
FIG. 8 is a schematic representation of the manner in which the dispenser operates to displace a receptacle to a position for receiving the dispensed product.
Figure 1:
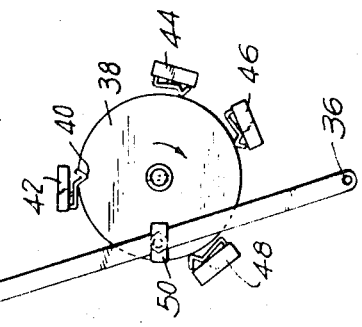
FIG. 1 is a schematic front elevation of a dispenser which is provided with the structure of the invention.
Figure 1:
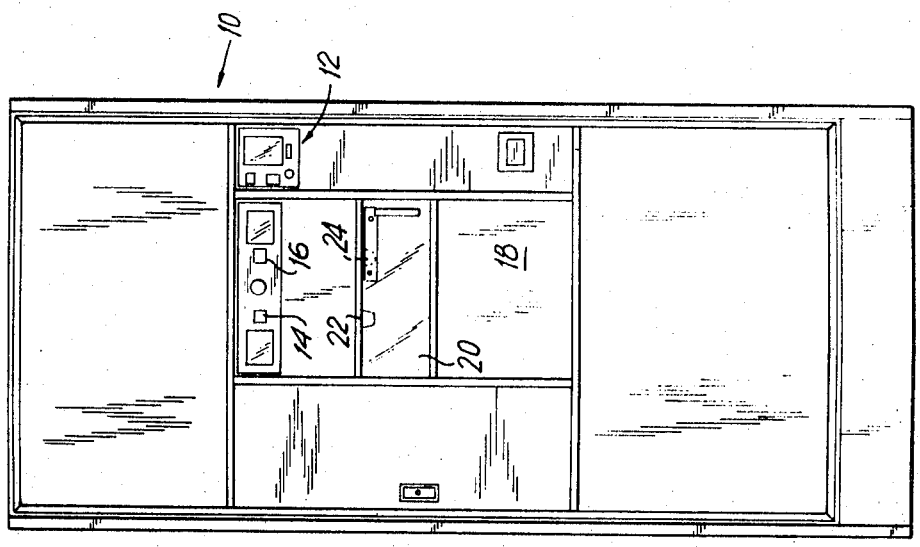

Referring now to FIG. 1, a dispenser 10 is shown therein in front elevation, this dispenser being of the type which is disclosed in application Ser. No. 702,855, filed on Feb. 5, 1968. The illustrated dispenser has a coin-receiving unit 12 for actuating the dispenser when a suitable coin is introduced into the unit 12. This particular dispenser is designed to dispense two products of two different flavors, respectively, and in order to select one of the flavors the operator will close either the switch 14 or the switch 16. The dispenser has a front wall 18 on which a door 20 is guided for movement, and the dispensed product will issue, when switch 14 is closed, through nozzle 22 and, when switch 16 is closed, through nozzle 24. The door has at its exterior a suitable handle 26 (FIG. 8) in the form of an angle member fastened to the door 20, for example. The operator will displace the door 20 in the direction of the arrow 28 of FIG. 8 to open the door so as to give access to the space from which the dispensed product is withdrawn. The dispensed product is deposited within a receptacle 30 which is displaced in the direction of the arrow 32 so as to initially be located either beneath the nozzle 22 or beneath the nozzle 24 depending upon which of the switches 14 or 16 has been closed. As is schematically shown in FIG. 8 the receptacle 30 is displaced by way of a swing lever 34 which has a lower turning axis 36, the lever being controlled by a rotary disc 38 provided with a notch 40 which forms a cam. During one operating cycle the disc 38 is rotated in a clockwise direction, as viewed in FIG. 8, through a single revolution, successively actuating the switches 42, 44 and 46 so as to bring about dispensing of the selected product in a manner which is described in detail in the above application. When the notch 40 reaches the switch 48 shown in FIG. 8 it will actuate the structure of the present invention.

The same results can be achieved with other structures, such as by a chain or belt drive which moves a trip lever to trip the switches in sequence.

As is disclosed in the above application, after the receptacle 30 has been situated either beneath the nozzle 22 or beneath the nozzle 24 for a length of time sufficient to receive a given amount of the selected product, the receptacle 30 is displaced to a removal station situated behind the right end of the door 20, as viewed in FIG. 8, when this door is in its closed position, so that upon opening of the door the space behind the right end thereof, as viewed in FIG. 8 is uncovered to give access to the receptacle 30 and the product therein, so that the receptacle 30 and the product therein can be removed. The lever 34 is swung about the axis 36 by way of a transmission 50 to the lever 34 from the rotary disc 38, as described in the above application.

The door 20 forms part of the access control of the invention. As may be seen from FIG. 2, the door 20 is supported at the rear inner surface of the wall 18 for movement to the right and left by way of an upper guide 52 and a lower guide 54. An end stop 56 limits the movement of the door 20 to its closed position and determines the closed position of the door 20. The guides 52 and 54 can have any desired construction and are shown in the form of simple angle members carried by the inner surface of the wall 18, as is clearly apparent from FIG. 3. Fixed to and forming part of the door 20 is an engaging means 58 in the form of a bracket fixed to the inner surface of the door 20 and extending upwardly beyond the guide 52, as is apparent from FIG. 3. The engaging means 58 forms with the door 20 a door means movable from the closed, access-preventing position shown in FIG. 2 to the fully open, access-affording position indicated in FIG. 4. A spring 60 is stretched between and connected to a bracket 62 fixed to the inner surface of the wall 18 and the engaging means 58 so that in this way the structure includes a spring means constantly urging the door means to return to its closed position. The door 20 is in the form of a clear, transparent plastic or glass.

Figure 2:
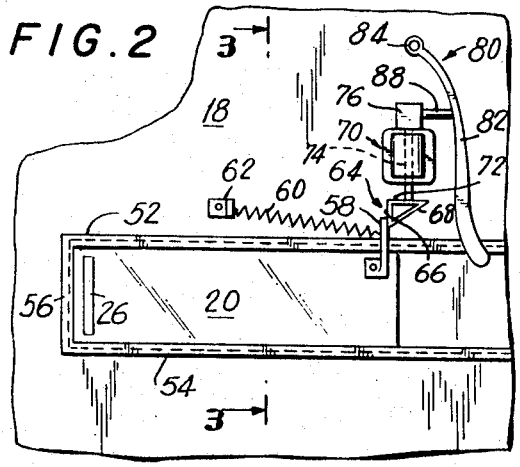
FIG. 2 is a fragmentary elevation of the structure of the invention as seen when looking toward the rear inside surface of a front wall of the dispenser of FIG. 1.
Figure 4:
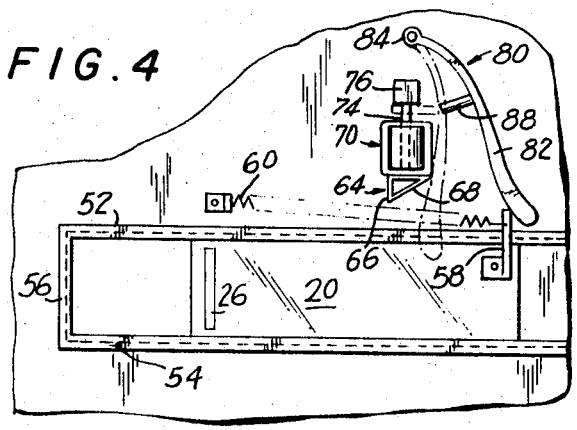
FIG. 4 shows the position which the parts of FIG. 2 assume when a door has been displaced to an open position.

A blocking means 64 is shown in FIG. 2 in its blocking position where it is situated next to and in the path of movement of the engaging means 58 so as to prevent movement of the door means to its fully open position shown in FIG. 4. For this purpose the blocking means 64 can take the form of an elongated solid or tubular member of triangular cross section having a substantially vertical side surface 66 against which the bracket 58 abuts should an attempt be made to open the door 20 before the dispenser is properly actuated to dispense a product.

This blocking means 64 also has a lower inclined surface 68 which coacts with the engaging means 58 in a manner described in great detail below. However, the structure can be reversed by providing member 58 with an upper inclined surface corresponding to surface 68.

A displacing means 70 is provided for raising the blocking means 64 from its lower blocking position shown in FIG. 2 up to a non-blocking position shown in FIG. 4. This displacing means 70 takes the form of an electromagnet which when energized pulls the blocking means 64 upwardly to the non-blocking position of FIG. 4. For this purpose the upper wall 72 of the blocking means 64 can have one or more magnetic portions to be attracted to one or more coils of the electromagnet 70 so as to be pulled upwardly when the displacing means 70 is actuated.

Figure 3:
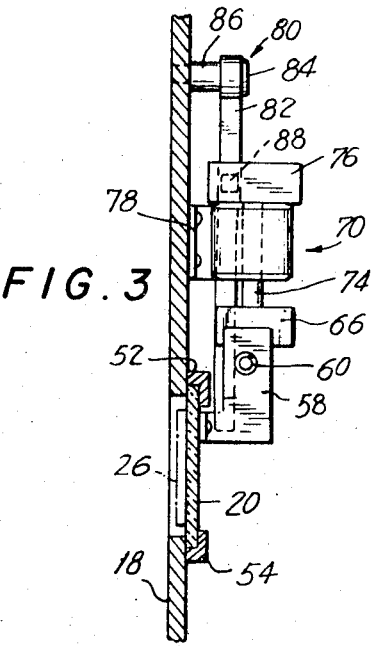
FIG. 3 is a sectional elevation taken along line 3—3 of FIG. 2 in the direction of the arrows and showing the structure of FIG. 2 at a scale which is enlarged as compared to FIG. 2.

The blocking means 64 includes a vertically extending guide 74 guided for movement through the electromagnet 70 and fixedly carrying at its top end a projection 76 which forms part of the blocking means, the tubular triangular member which has the surfaces 66 and 68 being fixed to the bottom end of the vertically displaceable guide member 74. The electromagnet 70 is fixed as by a bracket 78 to the inner surface of the wall 18, as indicated in FIG. 3. Also, it is to be noted that the blocking means 64 is gravity-actuated toward its blocking position. In other words, when the electromagnet 70 is not energized the projection 76 engages the top end of the electromagnet to hold the blocking means at its blocking elevation. Upon de-energizing of the electromagnet 70 the blocking means 64 simply falls to the blocking position shown in FIGS. 2 and 3.

A holding means 80 is provided for releasably holding the blocking means 64 in its non-blocking position after the electromagnet 70 has been momentarily energized to displace the blocking means to its non-blocking position. This holding means 80 includes a swing-lever 82 formed at its top end with an opening through which a headed pin 84 extends, this pin being directly carried by the wall 18 and having an axis which determines the swing-axis of the lever 82. A suitable spacer 86 is mounted on the pin 84 betwen the wall 18 and the lever 82, as shown in FIG. 3. The releasable holding means 80 includes in addition to the lever 82 an extension 88 in the form of a rigid finger fixed to and projecting to the left from the lever 82, as viewed in FIG. 2. In the position of the parts shown in FIG. 2, the center of gravity of the holding means 80 is situated to the right of the swing axis provided by the pin 84, so that the holding means is constantly gravity-actuated to be urged to swing in a clockwise direction, as viewed in FIG. 2. However, in the position of the parts shown in FIG. 2 the free end of the extension 88 rests against the right side surface of the projection 76 of the blocking means, so that the holding means 80 at this time cannot swing a clockwise direction beyond the position indicated in FIG. 2.

When the displacing means 70 is energized the blocking means 64 will be at least momentarily raised to the non-blocking position shown in FIG. 4. As a result the lower surface of the projection 76 will move upwardly beyond the extension 88, and under the force of gravity the holding means 80 will be capable of freely swinging to the dot-dash line position shown in FIG. 4 where the extension 88 is situated beneath the projection 76 so that now the holding means releasably maintains the blocking means 64 in its non-blocking position. In this latter position the lowermost edge of the blocking means is situated at an elevation sufficiently high to permit the top edge of the engaging means 58 to pass freely beneath the blocking means toward the right, as viewed in FIG. 4. Thus, the operator can now displace the door 20 to the fully open position shown in FIG. 4.

However, it will be noted that after the door 20 has been moved to a location where the engaging means 58 is situated slightly beyond the lowermost edge of the blocking means, this engaging means 58 will engage the swing lever 82 so as to displace the latter from the dot-dash line position of FIG. 4 to the solid line position of FIG. 4 when the door 20 is moved to its fully open position. In order to provide to the left of the door 20, as viewed in FIG. 4, a space sufficiently great to enable the hand of the operator to engage the receptacle 30, it is essential for the holding means 80 to be displaced to the solid line position shown in FIG. 4 where the extension 88 is situated beyond the projection 76, and as a result this movement of the holding means 80 to the solid line position of FIG. 4 in connection with opening of the door will release the blocking means so that it is free to fall back to its blocking position. Thus, the door means itself displaces the holding means from its holding position to its release position where it releases the blocking means for return movement to its blocking position.

Figure 5:
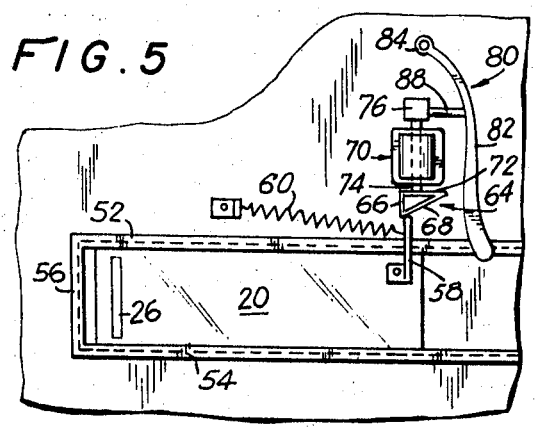
FIG. 5 shows the position of the parts of FIGS. 2 and 4 during return of a door toward its closed position.

As may be seen from FIG. 5, and during return of the door 20 to its closed position, the free end of the extension 88 will again engage the right side surface of the projection 76. Moreover, as the door 20 returns to its closed position, the top edge of the engaging means 58 engages and rides along the lower inclined surface 68 of the blocking means 64 so as to raise the latter. However, as is shown in FIG. 5, when the top edge of the engaging means 58 engages and rides beneath the lowermost edge of the blocking means, the blocking means will be at an elevation lower than its elevation when in its non-blocking position shown in FIG. 4, so that the engaging means only raises the blocking means through part of the distance toward its non-blocking position during the return of the door 20 to its closed position. The elevation to which the blocking means is raised by the engaging means 58 during return of the door 20 is insufficient to raise the projection 76 above the extension 88, so that the holding means 80 is maintained in the position shown in FIG. 5 and cannot again assume its holding position. Once the engaging means 58 moves to the left, as viewed in FIG. 5, beyond the blocking means 64, the blocking means again falls to its blocking position shown in FIG. 2, so that now the door 20 cannot again be displaced to the open position until the displacing means 70 is again actuated. The door means of the invention provides a space large enough for the hand of the operator to have access to the interior of the dispenser only when the door means is in the fully open position of FIG. 4. It is only when the extension 88 moves to the right, as viewed in FIG. 4, beyond the projection 76 that a space large enough for the operator's hand is provided to the left of the door 20, and thus the blocking means will necessarily be released for return to its blocking position before the operator can introduce his hand into the dispenser. It is furthermore to be noted that the operator must at all time move the door manually in opposition to the spring means 60. Whenever the door is released by the operator the spring means 60 will automatically return the door to its closed position.

Figure 9:
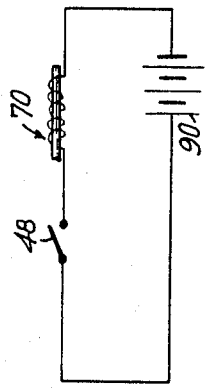
FIG. 9 is a schematic wiring diagram showing a third embodiment of a structure for displacing the blocking means to its non-blocking position, the embodiment of FIG. 9 including a switch which is shown in FIG. 8.
Figure 6:
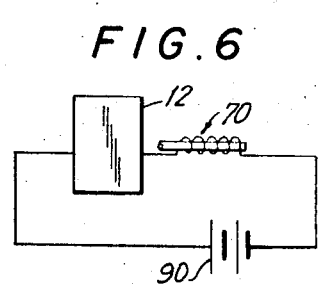
FIG. 6 is a schematic wiring diagram showing one possible structure for displacing a blocking means to its non-blocking position.
Figure 7:
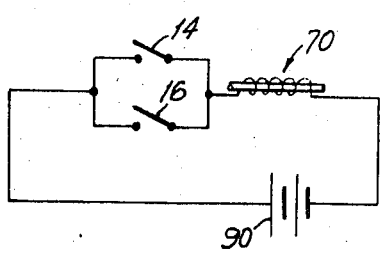
FIG. 7 is a schematic wiring diagram showing another embodiment of a structure for displacing a blocking means to its non-blocking position.

As is indicated in FIGS. 6, 7 and 9, the displacing means 70 is situated in an electrical circuit supplied with current from any suitable source 90. In the embodiment of FIG. 6 the electrical circuit includes the coin-operated mechanism 12 which is provided in a known way with a switch which closes the circuit of FIG. 6 during movement of the coin through the unit 12, and as a result the displacing means 70 will be momentarily actuated to displace the blocking means 64 to its non-blocking position with the circuit of FIG. 6 when a coin is introduced. The holding means 80 will thus automatically assume its holding position shown in dot-dash lines in FIG. 4 to maintain the blocking means in its non-blocking position until the door has been displaced sufficiently toward its fully open position as indicated above.

In the embodiment of FIG. 7, the displacing means 70 is actuated by closing either of the switches 14 and 16, these switches being connected in parallel in the circuit of FIG. 7. Thus, with this embodiment the blocking means will be automatically displaced to its non-blocking position when the operator actuates one or the other of the switches 14 or 16 to select a given flavor of the product which is dispensed.

On the other hand, as is indicated in FIGS. 8 and 9, the rotary cam disc 38 can actuate the microswitch 48 when the switch-actuating member thereof is received in the V-notch 40, after one or the other of the products has been dispensed by actuation by the switch 44 or the switch 46, during return of the disc 38 to the starting position thereof shown in FIG. 8. Thus, with this embodiment, as is indicated in FIG. 9, the switch 48 will automatically be closed as part of the operating cycle of the dispensing structure to displace the blocking means to its non-blocking position only after a given amount of the product has been deposited in the receptacle 30.

It is to be noted that since the blocking means 64 and the holding means 80 are gravity actuated, no springs are required to coact with these components of the invention. In addition, it is to be noted that the entire access-control structure of the invention is situated behind the wall 18 where it cannot be tampered with. Therefore, with the exceedingly simple and reliable structure of the invention it is possible to achieve access control in a manner which will provide access only once during each dispensing cycle, reliably preventing opening of the door 20 when the dispenser is not used so as to prevent tampering with the dispenser on the one hand, and so as to maintain the highest standards of hygiene, on the other hand.

What is claimed is:

1. Access control for dispensers and the like, comprising door means movable between a closed, access-preventing position and a fully open, access-affording position, blocking means coacting with said door means and having a blocking position preventing movement of said door means to said open position thereof and a non-blocking position freeing said door means for movement to said fully open position thereof, so that access is afforded through said door means only upon displacement of said blocking means from said blocking to said non-blocking position thereof, displacing means coacting with said blocking means for displacing the latter from said blocking to said non-blocking position thereof, to free said door means for movement to said fully open position thereof, releasable holding means responding automatically to displacement of said blocking means to said non-blocking position thereof for assuming a holding position holding said blocking means in said non-blocking position thereof, said releasable holding means being movable from said holding position to a release position releasing said blocking means for return to said blocking position thereof, said holding means coacting with said door means to be displaced by the latter to said release position upon movement of said door means to said fully open position so that said blocking means does not resume its blocking position until said door means has been displaced to its fully open position, and engaging means carried by said door means for movement therewith and engaging said blocking means during return of said door means to said closed position thereof for providing return movement of said door means past said blocking means during said return movement of said door means without again displacing said blocking means to said non-blocking position and while also preventing return of said holding means to said holding position, said blocking means preventing a second movement of said door means to said fully open position thereof once said engaging means has moved beyond said blocking means during return of said door means to said closed position until said displacing means has again been actuated.

2. The combination of claim 1 and wherein said displacing means includes an electromagnet acting on said blocking means to displace the latter momentarily to said non-blocking position upon energizing of said electromagnet for a length of time sufficient to permit said holding means to assume said holding position thereof.

3. The combination of claim 2 and wherein said electromagnet when energized raises said blocking means to said non-blocking position, and said blocking means being gravity-actuated for return to said blocking position.

4. The combination of claim 3 and wherein said holding means is gravity-actuated for movement to said holding position, said door means when displaced to its fully open position moving said holding means in opposition to the force of gravity acting thereon to said release position whereupon said blocking means falls by gravity to said blocking position.

5. The combination of claim 4 and wherein said blocking means is vertically movable and said holding means is swingable about a horizontal axis.

6. The combination of claim 5 and wherein said blocking means has an upper projection which moves with said blocking means, said holding means including a swing-lever and an extension projecting therefrom to swing automatically beneath said projection of said blocking means upon movement of said blocking means to said non-blocking position for maintaining said blocking means in said non-blocking position, said holding means having a center of gravity situated to one side of said horizontal axis at least when said holding means is in said release position thereof.

7. The combination of claim 6 and wherein said engaging means acts on said blocking means during return of said door means to said closed position for raising said projection of said blocking means to an elevation lower than that to which it is raised upon energizing of said electromagnet so as to prevent said extension from again moving beneath said projection during return of said door means to said closed position thereof.

8. The combination of claim 7 and wherein said blocking means has a side surface directed toward and situated in the path of movement of said engaging means to coact with the latter for preventing movement of said door means to said fully open position thereof when said blocking means is in said blocking position, and said blocking means having a lower inclined surface directed away from said side surface and engaged by said engaging means during return of said door means to said closed position.

9. The combination of claim 1 and wherein a spring means coacts with said door means for urging the latter to return to said closed position thereof.

10. The combination of claim 2 and wherein said electromagnet is situated in an electrical circuit which includes a switch which when closed energizes said electromagnet.

11. The combination of claim 10 and wherein said switch forms part of a coin-receiving assembly.

12. The combination of claim 10 and wherein a plurality of said switches are connected in parallel into said circuit to be selectively closed for selecting one of a given number of products which are dispensed.

13. The combination of claim 10 and wherein an automatic means coacts with said switch for automatically closing the latter after a given product has been dispensed.

14. The combination of claim 1 and wherein said blocking means is gravity-actuated for return to said blocking position thereof.

15. The combination of claim 1 and wherein said holding means is gravity-actuated for movement by gravity to said holding position thereof.

16. The combination of claim 1 and wherein said engaging means forms a part of said door means which coacts with said blocking means to prevent movement of said door means to said fully open position when said door means is in said closed position thereof.

References Cited

UNITED STATES PATENTS

| | | | |
|---|---|---|---|
| 949,221 | 2/1910 | Cossey | 49—449 X |
| 1,435,441 | 11/1922 | Zsoldos | 49—68 X |
| 1,573,770 | 2/1926 | Lucas | 49—163 X |
| 2,049,860 | 8/1936 | Olson | 70—78 X |
| 2,053,624 | 9/1936 | Meunier et al. | 49—35 X |
| 2,066,655 | 1/1937 | Stevens | 49—24 X |
| 2,085,832 | 7/1937 | Shochet | 312—138 |
| 2,854,116 | 9/1958 | Gray | 49—362 X |

DENNIS L. TAYLOR, Primary Examiner

U.S. Cl. X.R.

49—449; 312—138